United States Patent [19]
Christensen

[11] Patent Number: 5,610,921
[45] Date of Patent: Mar. 11, 1997

[54] SCALABLE ARCHITECTURE FOR ASYNCHRONOUS TRANSFER MODE SEGMENTATION AND REASSEMBLY

[75] Inventor: Soeren S. Christensen, Santa Clara, Calif.

[73] Assignee: Sun Microsystems, Inc., Mountain View, Calif.

[21] Appl. No.: 522,432

[22] Filed: Aug. 31, 1995

[51] Int. Cl.⁶ .............................. H04L 12/28; H04L 12/56
[52] U.S. Cl. ...................... 370/395; 370/471; 395/200.2
[58] Field of Search ................ 370/60, 60.1, 94.1, 370/94.2, 94.3, 99; 395/200.02, 200.2

[56] References Cited

U.S. PATENT DOCUMENTS

| | | | |
|---|---|---|---|
| 5,136,584 | 8/1992 | Hedlund | 370/94.1 |
| 5,274,768 | 12/1993 | Traw et al. | 395/200.2 |
| 5,289,579 | 2/1994 | Punj | 395/200.2 |
| 5,341,376 | 8/1994 | Yamashita | 370/99 |
| 5,375,121 | 12/1994 | Nishino et al. | 370/94.2 |
| 5,381,411 | 1/1995 | Ohno et al. | 370/60 |

*Primary Examiner*—Hassan Kizou
*Attorney, Agent, or Firm*—Blakely Sokoloff Taylor & Zafman LLP

[57] ABSTRACT

A scalable, asynchronous transfer mode ("ATM") interface for generating an ATM cell comprising an addressing element, a memory element and a cell generating element. The addressing element is used to initiate generation of the ATM cell by transmitting one or more memory addresses to the memory element. The memory element, accessible to the addressing element, is used to store at least one datagram corresponding to the memory address(es) and to subsequently output the at least one datagram to the cell generating element. The cell generating element is coupled to the memory element in order to receive at least one datagram and produce the ATM cell. Finally, a controlling element is coupled to the addressing element and the cell generating element in order to control their operations.

19 Claims, 7 Drawing Sheets

SCALABLE ARCHITECTURE FOR ASYNCHRONOUS TRANSFER MODE SEGMENTATION AND REASSEMBLY

BACKGROUND OF THE INVENTION

1. Field of the Invention

The present invention relates to a communication system. More particularly, the present invention relates to an asynchronous transfer mode segmentation and reassembly interface ("ATM interface") which can be easily modified to accommodate different types of workstations and/or networks.

2. Description of the Prior Art

Over the last two decades, computer manufacturers generally are manufacturing resources compatible with decentralized, shared networks (e.g., local area networks). These decentralized networks allow information, typically restricted in form to one particular data type, to be shared between resources. With the emergence of multi-media communications, however, networks are now being required to support multiple data types. As a result, network manufacturers are tending to concentrate their efforts toward asynchronous transfer mode ("ATM") networking systems.

Referring to FIGS. 1 and 2, a conventional ATM networking systems 100 comprises a workstation 105 coupled to a network 110 (e.g., fiber optics, twisted pair or any other conventional medium) through a conventional ATM interface 115 and a physical device 120. The conventional ATM interface 115 and the physical device 120 are connected together through a plurality of unidirectional communication lines 125 configured in accordance with a well-known, standard ATM "Utopia" interface 130 (i.e. Universal Testing Operation Interface for ATM). This guarantees compatibility between the ATM interface 115 and the physical device 120.

One important function of the conventional ATM interface 115 and the physical device 120 is to accurately translate a "datagram" of information from a first data type supported by the workstation 105 into a standard format (e.g., an ATM cell) which can be transferred subsequently to other data types. Throughout the present application, a "datagram" is generally defined herein as a plurality of information bits in series.

Typically, as shown in FIG. 2, the workstation 105 internally processes data as a datagram having an arbitrary length, commonly referred to as a Service Data Unit ("SDU") 190. Thereafter, in order to transmit the SDU to a remotely located device coupled to the network 110, the workstation 105 performs operations on the SDU 190 to produce a protocol data unit ("PDU") 191 therefrom. The PDU 191 is a datagram having a variable bit length so as to include at least the SDU 190 and bytes of information such as padding 192 used for completely "filling" the PDU 191, control 193 and a Cyclic Redundancy Checkword 194 which is used to check that no errors occur in transmission, generally referred to as "PAD" information, "CNTL" information and "CRC", respectively.

The conventional ATM interface 115 converts the PDU 191 into at least one ATM cell 195 depending on the size of the PDU 191. If the PDU 191 has a maximum of forty (40) bytes of data, the conventional ATM interface 115 produces one ATM cell. Otherwise, the conventional ATM interface 115 produces a sequence of ATM cells wherein only the last of the sequence of ATM cells include the CNTL information 193 and CRC 194 and at most the last two ATM cells may include PAD information 192.

Still referring to FIG. 2, each ATM cell 195 includes a four (4) byte header 196 for indicating a designated "target" location of its corresponding ATM cell 195 and a one (1) error byte 197 which is used to monitor for errors in transmitting the header. The error byte 197 is provided by a physical layer of the physical device 120 (discussed below). Moreover, each of the ATM cells 195 includes a forty-eight (48) byte "payload" 198 which solely includes data of the PDU 191 until the last few ATM cells as discussed above.

Referring back to FIG. 1, the physical device 120 consists of a physical layer 135 and a physical media dependency ("PMD") 140, collectively operating as both a transmitter and a receiver, to propagate information between the network 110 and the workstation 105. With respect to the transmitting operations, the conventional ATM interface 115 serially transmits the ATM cells to the physical layer 135. The physical layer 135 converts these ATM cells into a bit stream which is input into the PMD 140. The PMD 140 formats the bit stream according a particular data type used by the network 110. The physical device 120 operates in an opposite manner for the receiving operation.

More specifically, the conventional ATM interface 115 provides a reception signal path 146 and a transmission signal path 147, both of which including in series a pair of state machines working in combination with a storage queue (e.g., a First-In, First-Out "FIFO" queue). For the reception signal path 146, a receiver ("RX") state machine 150 receives an ATM cell from the physical layer 135. Then, the RX state machine 150 (i) removes the header portion of the ATM cell, (ii) performs CRC calculations on the payload of the ATM cell and if no transmission errors, (iii) transfers the payload into a first storage queue (e.g., a First-In, First-Out queue) 155 for temporary storage. Upon receipt of appropriate control signals, the first storage queue 155 transfers the payload through a system bus interface 170 and onto a system bus 165 for appropriate storage in the memory element 145. This transfer is controlled by a first interface state machine 160.

Additionally, for the transmission signal path 147, the memory element 145 places information onto the system bus 165 addressed to be transferred through the system bus interface 170 and into a second storage queue 180. Under control of the second interface state machine 175, the second storage queue 180 outputs the information into a transmitter ("TX") state machine 185 for transmission through the Utopia interface 130 and into the physical device 120.

This implementation for the ATM interface has a number of disadvantages. One disadvantage is that the conventional ATM interface is not easily modifiable (i.e., scalable) to accommodate for different capabilities of the workstation and/or the selected network. For example, if the operational speed of the network is increased from 616 mega-bits-per-second ("Mbps") to 1.2 giga-bits-per-second("Gbps"), the entire architecture of the conventional ATM interface would likely be required to be completely re-designed to allow for the increased throughput.

Another reason is that the conventional ATM interface is not "reusable" i.e., the architecture does not support a wide variety of workstation and network configurations.

Yet another disadvantage is that the conventional ATM interface arbitrates for ownership of the system bus of the workstation rather than using scheduling techniques. This may lead possible arbitration problems between transmission and reception elements. Thus, it would be desirous to provide an ATM interface that overcomes the above-identified advantages.

SUMMARY OF THE INVENTION

The present invention relates to a scalable, asynchronous transfer mode ("ATM") interface used for generating at least one ATM cell. The ATM interface comprises an addressing element, a memory element and a cell generating element. The addressing element is used to initiate generation of the ATM cell(s) by transmitting at least one memory address(es) to the memory element. It is contemplated that the addressing element may include a scheduler and an address generator.

The memory element, accessible by the addressing element, is used to store at least one datagram corresponding to the memory address(es) and subsequently outputting at least one datagram to the cell generating element. In addition, the cell generating element is coupled to the memory element in order to receive at least one datagram and produce the ATM cell(s), including a header and a payload, including at least one datagram. It is contemplated that the cell generating element includes a payload generator for generating the payload and a header generator for generating the header.

Finally, a controlling element is coupled to the addressing element and the cell generating element in order to control the operations of the addressing element and the cell generating element so that collectively, the addressing, memory and cell generating elements produce the ATM cell(s).

BRIEF DESCRIPTION OF THE DRAWINGS

The features and advantages of the present invention will become apparent from the following detailed description of the present invention in which.

DETAILED DESCRIPTION OF THE INVENTION

In the following detailed description, the present invention describes an ATM segmentation and reassembly interface enabling an ATM communication network to be scalable and reusable. In the present application, there are numerous specific details set forth, such as the specific construction of the scheduler, address generator, payload generator and the like. It is apparent, however, to one skilled in the art, that the present invention may be practiced without incorporating these specific details. Moreover, it should be noted that there exist some instances where well-known circuits and the like are not set forth in detail in order to avoid unnecessarily obscuring the present invention.

In the detailed description, a number of terms are frequently used to describe certain control circuits and signal representations which are defined herein. A "state machine" is a combination of conventional logic, typically synchronous in nature, which receives inputs that are combined with its self-contained state information in order to "intelligently" produce at least one output. A "selector" is defined as one or more conventional multiplexing logic gates arranged to selectively output one of a plurality of inputs. An "event" is an operation predetermined to occur at a specific time. A "line" is an electrical and mechanical connection or multiple independent connections between two electronic elements.

Figure 3:
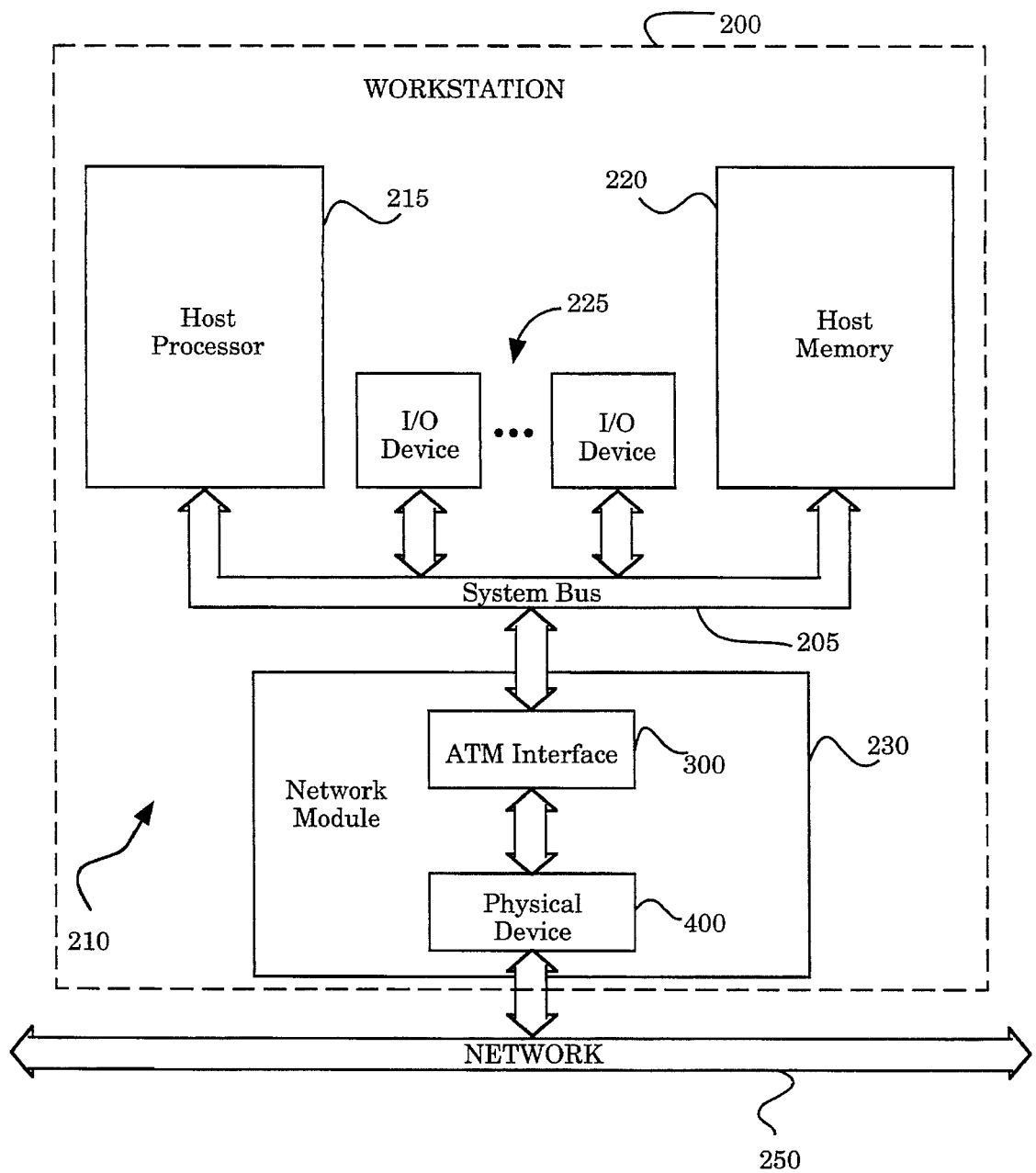
FIG. 3 is a block diagram of an illustrative embodiment of an ATM communication system comprising a workstation coupled to a network through a network module including an ATM interface and a physical device.

Referring to FIG. 3, an embodiment of a workstation 200 utilizing the present invention is illustrated. The workstation 200 generally comprises a system bus 205 including address, data and control bus lines for communicating information between a plurality of bus agents 210. The plurality of bus agents 210, including but not limited to a host processor 215, host memory 220, a plurality of input/output ("I/O") devices 225 and a network module 230, all of which are coupled together through the system bus 205. These bus agents 215-230 are those typically found in most general purpose workstations, including those manufactured by Sun Microsystems, Inc. of Mountain View, Calif.

Most relevant to this application is the network module 230 which includes an ATM segmentation and reassembly interface ("ATM interface") 300 and a physical device 400. The ATM interface 300 and the physical device 400 are used collectively to enable the workstation 200 to transfer information to and receive information from a network 250 having medium such as fiber optics, twisted pair and the like. Although the ATM interface 300 supports data transfers to and from the physical device 400, for clarity sake, only the operations concerning the data transmission path are described.

Figure 4:
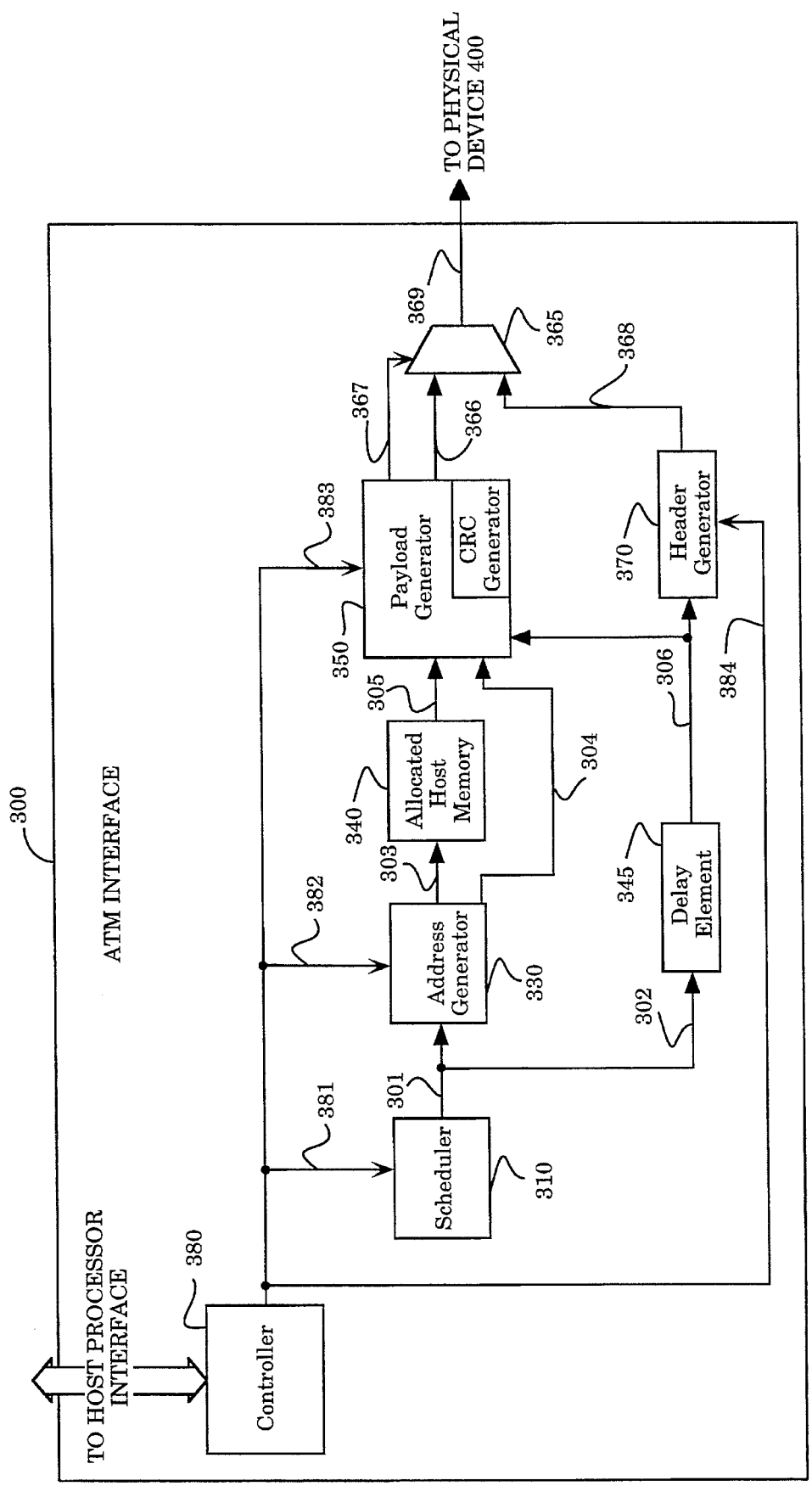
FIG. 4 is a block diagram of an illustrative embodiment of the ATM interface.

Referring now to FIG. 4, the ATM interface 300 comprises a scheduler 310, an address generator 330, an allocated portion of host memory ("allocated host memory") 340, a payload generator 350, a header generator 370 and a controller 380. The controller 380 is coupled to the scheduler 310, address generator 330, payload generator 350 and the header generator 370 via control lines 381-384, respectively. The controller 380 receives control information from the host processor (not shown) executing system software and propagates such control information through these control lines 381-384 to maintain tables, registers and local memories within the scheduler 310, the address generator 330, the payload generator 350 and the header generator 370.

The scheduler 310 is coupled to an address generator 330 and a delay element 345 via communication lines 301 and 302. These communication lines 301 and 302, whose construction is dependent from the number of data bus lines, transmit data (preferably a byte in size) into both the address generator 330 and the delay element 345. The data is used as a channel number operating as a table index ranging in value from "0" and "255". It is contemplated that the channel number could have any range of values depending on the number of data bits allocated to the channel number.

The address generator 330 receives the channel number from the scheduler 310 and translates that channel number into an address. Preferably, the address represents a unique address for a preselected amount of memory (i.e., an entry) within a limited address space forming the allocated host memory 340. The address generator 330, coupled to the allocated host memory 340 via a communication line 303, transmits the address accompanied by an appropriate "READ" control signal into the allocated host memory 340. Furthermore, the address generator 330 internally generates a number of control signals, transferred to the payload generator 350 via a control line 304, for use in reassembling one or a sequence of ATM cells if needed. For convenience, the remaining description will focus on the situation where only one ATM cell is necessary.

Upon receipt of an address from the address generator 330, the allocated host memory 340 retrieves a datagram corresponding to the address and transmits the datagram into the payload generator 350 through a communication line 305. The manner in which this datagram is stored corresponds to how the address generator 330 updates its read address. In synchronism with the transmission of the datagram into the payload generator 350, the delay element 345 also inputs the channel number into the payload generator 350. This can be accomplished by configuring the time delay associated with the delay element 345 to substantially correspond to the propagation time for information from the address generator 330 to emerge as retrieved data from the allocated host memory 340.

Thereafter, the payload generator 350 formats the datagram from the allocated host memory 340 into an ATM cell with CNTL information and CRC as well as PAD information, if necessary, appended to the datagram to form the payload of the ATM cell. Thereafter, the payload generator 350 outputs the payload into a main selector element 365 through a payload communication line 366.

The header of the ATM cell is stored in a header generator 370. The header generator 370 is local memory maintained by system software. This local memory is separated into a number of entries according to a "table" format, wherein one of the entries is selected by the channel number transmitted through a communication line 306. Upon the response, the header generator 370 outputs the header stored in the selected entry through communication line 368 and into the main selector element 365. The header and payload are combined by the selector element 365 under control by the payload generator 350 via control line 367 to produce the ATM cell.

Figure 5:
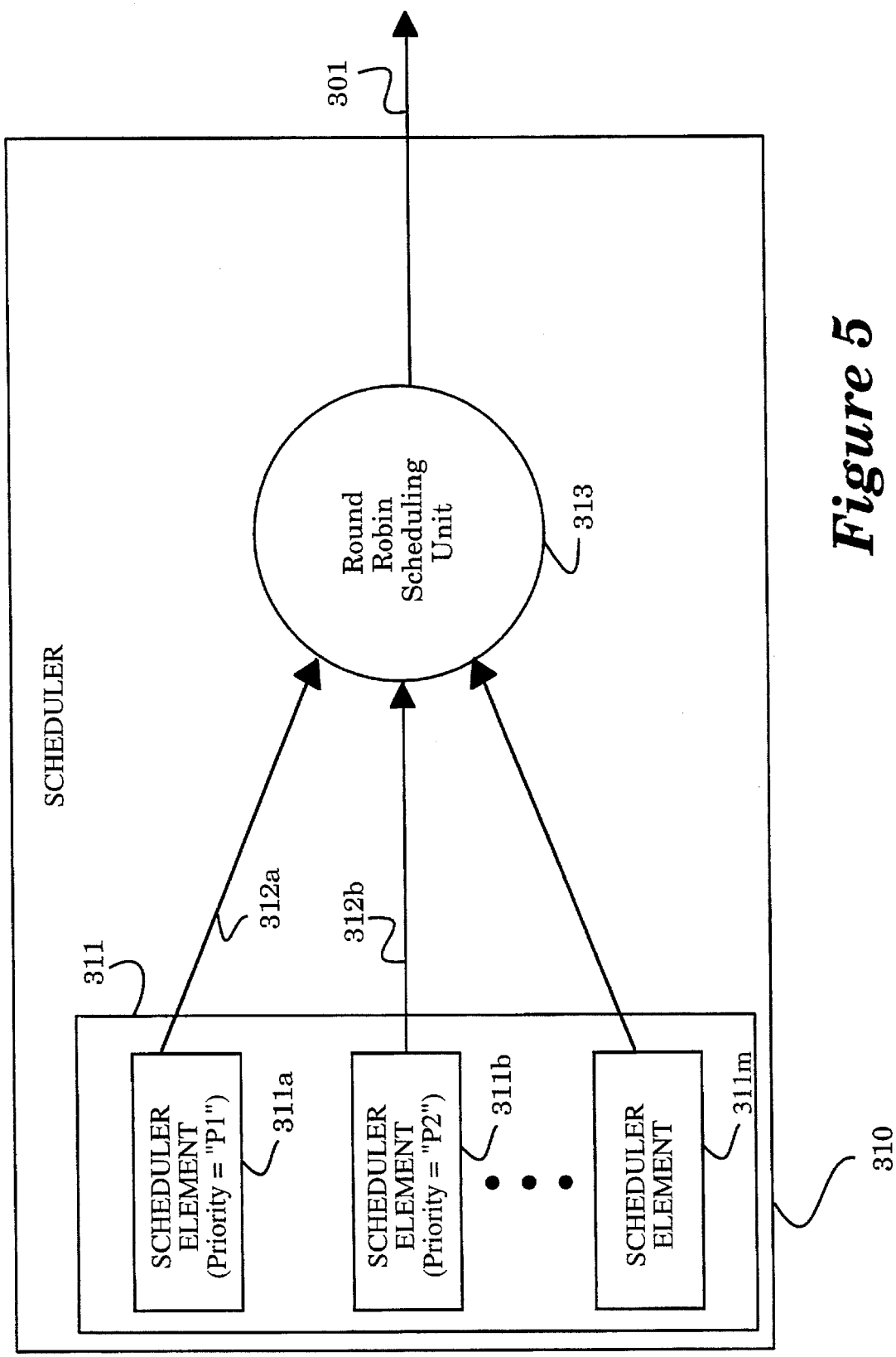
FIG. 5 is a block diagram of an illustrative embodiment of the scheduler of the ATM interface of FIG. 4 including multiple scheduler elements having different priority levels.

Referring to FIG. 5, the scheduler 310 is used for generating an event or a sequence of events to initiate the generation of a corresponding one or sequence of ATM cells. The scheduler 310 comprises at least one scheduler element, but preferably a plurality of scheduler elements 311a–311m ("m" being arbitrary) as illustrated, each capable of generating a single or a sequence of events in order to prompt the generation of ATM cell(s). Each of the scheduler elements 311a–311m is a collection of asynchronous logic gates, which are configured to control traffic according to a selected algorithm and under a priority-based protocol. For example, the scheduler elements may include a constant bit rate scheduler element ("CBR scheduler"), a variable bit rate scheduler element ("VBR scheduler") or any other well-known schedulers. It is appreciated that the scheduler 310 is scalable, thereby allowing any number of scheduler elements to be implemented and configured as required by the ATM networking system.

The scheduler elements 311a–311m are correspondingly coupled to a priority-based scheduling unit 313 (e.g., round-robin scheduling unit) via transmission lines 312a–312m which outputs a channel number from one of the scheduler elements 311a–311m with the highest priority. The priority associated with each of the scheduler elements 311a–311m is dynamically alterable through software.

For illustrative purposes, the scheduler element 311a may be a CBR scheduler having a first priority "P1" (highest) and scheduler element 311b may be a VBR scheduler having a second priority "P2", where "P2" is assigned a priority less than "P1". Accordingly, if the CBR scheduler 311a is in operation, its channel number is always output from the priority-based scheduling unit 313. If the CBR scheduler 311a is not in operation, the priority-based scheduling unit 313 checks whether the VBR scheduler 311b is in operation and if so, outputs the channel number generated from the VBR scheduler 311b. The same process occurs for all of the scheduler elements 311a–311m having different priority levels.

Figure 6A:
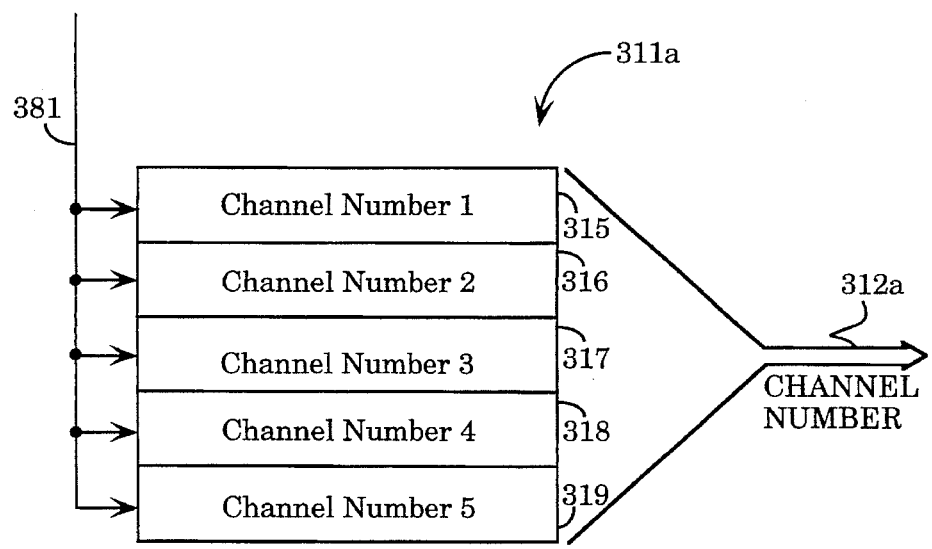
FIG. 6A is a block diagram of one embodiment of one of the multiple scheduler elements of FIG. 5 being a constant bit rate scheduler.

As shown in FIG. 6A, the CBR scheduler 311a is preferably a memory lookup table storing a plurality of channel numbers, identified as "channel 1"–"channel 5" for example, in unique address entries 315-319 as shown. The host processor controls which channel number is output to the priority-based scheduling unit 313 by selection of one of the address entries through control line 381. Alternatively, the CBR scheduler 311a may include a circular buffer including a plurality of registers for storing the channel number.

Figure 6B:
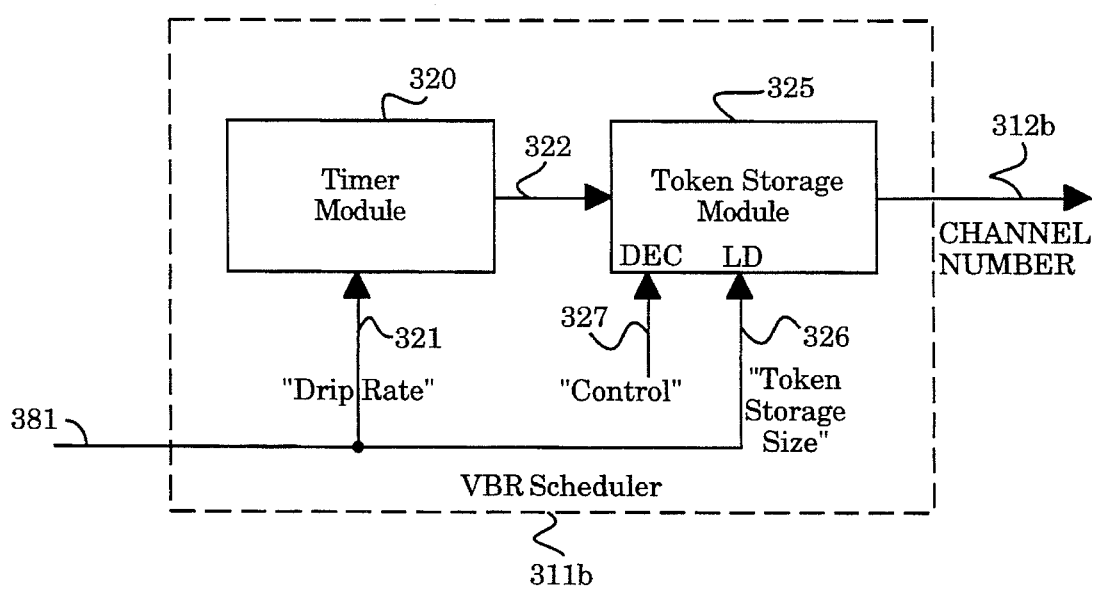
FIG. 6B is a block diagram of another embodiment of one of the multiple scheduler elements of FIG. 5 being a variable bit rate scheduler.

As further shown in FIG. 6B, the VBR scheduler 311b includes a timer module (e.g., counter) 320 and a token storage module 325 operating in conjunction to control ATM cell traffic propagating through communication line 301. In this application, a "token" represents an abstract measurement value used by the VBR scheduler 311b to indicate that an ATM cell requests transmission.

The token module 320 is programmable to generate a sequence of tokens representing of the desired transmission rate (i.e., "drip rate") of ATM cells through the ATM communication network. The drip rate is achieved by configuring the activation and deactivation of a signal line 321 such that the "drip" rate is equal to the desired speed of the ATM network divided by 48 bytes (i.e., size of an ATM cell). The activation and deactivation of the signal line 321 is controlled by the control line 381. For example, if the desired speed of the ATM network is 622 megabits per second ("MB/s"), the drip rate is equivalent to the following:

$$\frac{48 \text{ bytes} \times 8 \text{ bits/byte}}{622 \text{MB/s}} = \left(\frac{384}{622,000,000}\right) \text{sec.} \approx 617 \text{ nanoseconds}$$

The token storage module 325 is a queue for storing a predetermined number of tokens from the timer module 320. This predetermined number (i.e., queue size) is loaded via signal line 326, based on control line 381, to indicate the number of ATM cells that can be transferred in a burst (i.e., back-to-back). The tokens are input from the timer module 320 through signal line 322 causing the queue to "fill". Once an ATM cell associated with one of the tokens stored in the token storage module 325 is output from the ATM interface, a token decrement line 327 is asserted causing the token storage size to be decremented by one. If the number of tokens exceed the queue size, the tokens are discarded resulting in the ATM networking system failing to achieve its intended drip rate. This may be corrected by re-programming the queue size to be larger than the predetermined number.

Figure 7:
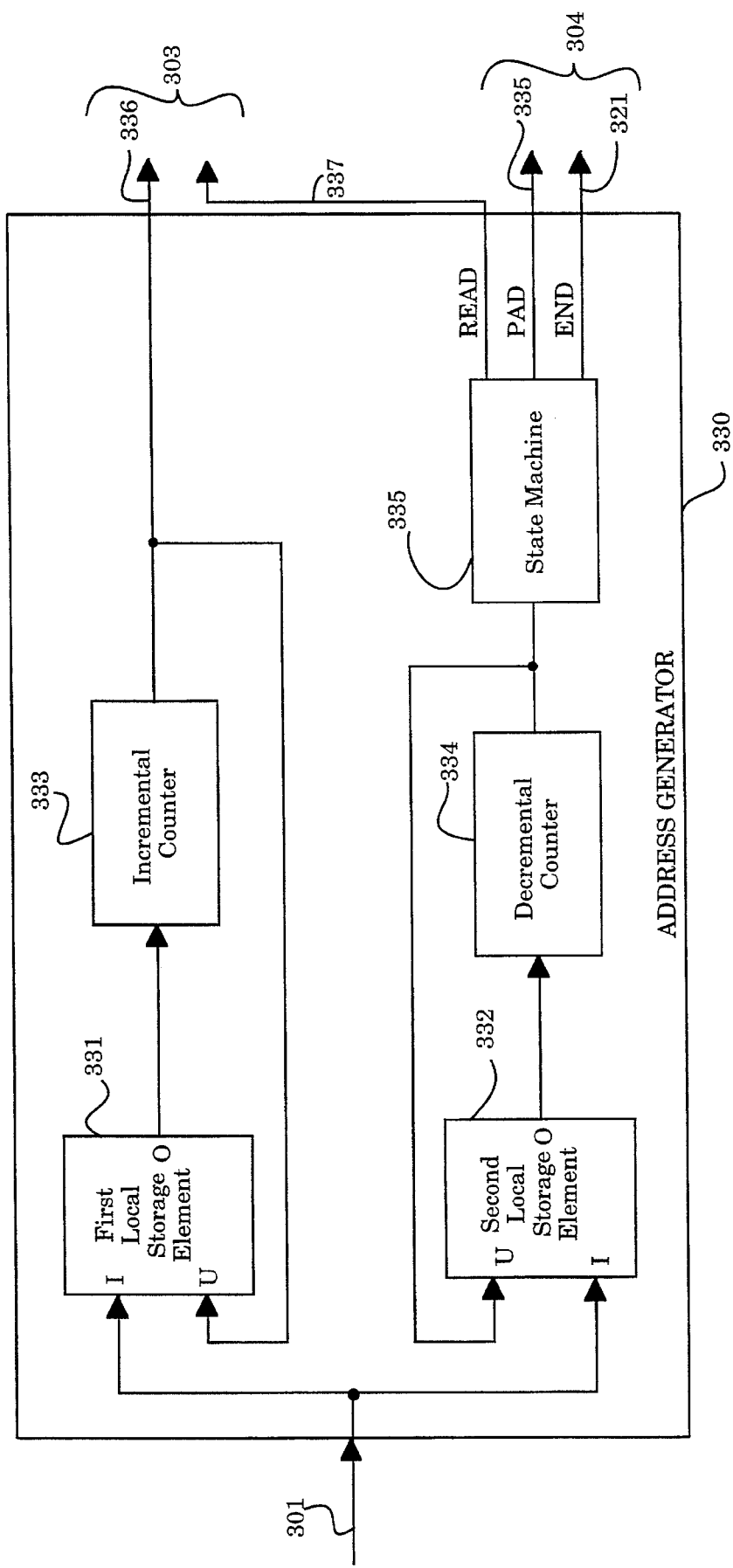
FIG. 7 is a block diagram of an illustrative embodiment of the address generator coupled to the allocated host memory as shown in FIG. 4.

Referring to FIG. 7, the data transmission undertaken by the address generator 330 is shown. The address generator 330 comprises a first local storage element 331, a second local storage element 332, an incremental counter 333, a decremental counter 334 and a state machine 335. Both the first and second local storage elements 331 and 332 include a predetermined amount of memory of which collectively is significantly less than the memory size of host memory. This memory is used to support a table having an arbitrary number of entries, each of which is storing a datagram of a predetermined bit length. For clarity, these local storage elements 331 and 332 are represented as block elements including (i) at least one input labeled "T" for receiving a channel number; (ii) an update input labeled "U" for receiving an incremented address or a decremented payload byte count from the incremental counter 333 or decremental counter 334, respectively; and (iii) an output labeled "O" for transmitting a memory address to the allocated host memory or the decremented payload byte count to the state machine 335 (see FIG. 4).

More specifically, the scheduler inputs the channel number through the communication line 301 into the "T" inputs of both the first and second local storage elements 331 and 332. The channel number is used as an index by the first local storage element 331 for obtaining a memory address used to obtain a datagram stored within the allocated host memory which is needed to form the ATM cell. Similarly, the second local storage element 332 is a predetermined amount of memory. However, that memory is used in maintaining the number of bytes remaining to be transferred to form the "payload" of a current ATM cell.

Since the address generator 330 contains information on what data locations are to be read from the allocated host memory, the address generator 330 must generate the addressing sequence required to read data from the allocated host memory necessary and to appropriately construct the "payload" of the ATM cell. This addressing sequence is accomplished by the first local storage element 331 transferring a first address associated with the channel number on communication line 303. The first address is used by the allocated host memory to supply a number of bytes associated with the first address ("supply bytes"). The second local storage element 332, on the other hand, uses the channel number to decrement the number of supply bytes from the number of bytes to be transferred thereby calculating the remaining bytes to be transferred. This number is stored back into the second local storage element 332 while the first address is incremented and returned to the first local storage element.

The state machine 335 controls the generation of READ, END and PAD control signals propagating through control lines 337-339. The READ control signal indicates a read from memory is requested and signals the allocated host memory 340 should respond with the current memory address. Moreover, the END control signal indicates that the transmission of data associated with the "payload" of the ATM cell is completed.

The PAD control signal indicates that padding is needed in order to correctly fill the ATM cell. The payload generator (see FIGS. 4 and 8) performs the actual padding by monitoring the number of bytes of data forming the datagram. The payload generator does not need to perform padding operations of the ATM cell(s) if the datagram is equal in size to forty plus forty-eight times "k" bytes (40+48×"k" bytes, where "k" is a whole number). Otherwise, the datagram requires padding.

Typically, padding is needed only in the last ATM cell. The exception is that padding may be required in the last two ATM cells of a sequence, provided after insertion of the payload, there is insufficient space remaining in the ATM cell to append the CRC in the last four bytes of the ATM cell. In such case, the address generator will generate another ATM cell for transmission of the CRC and reallocate data as needed in both ATM cells accompanied by padding.

Figure 1:
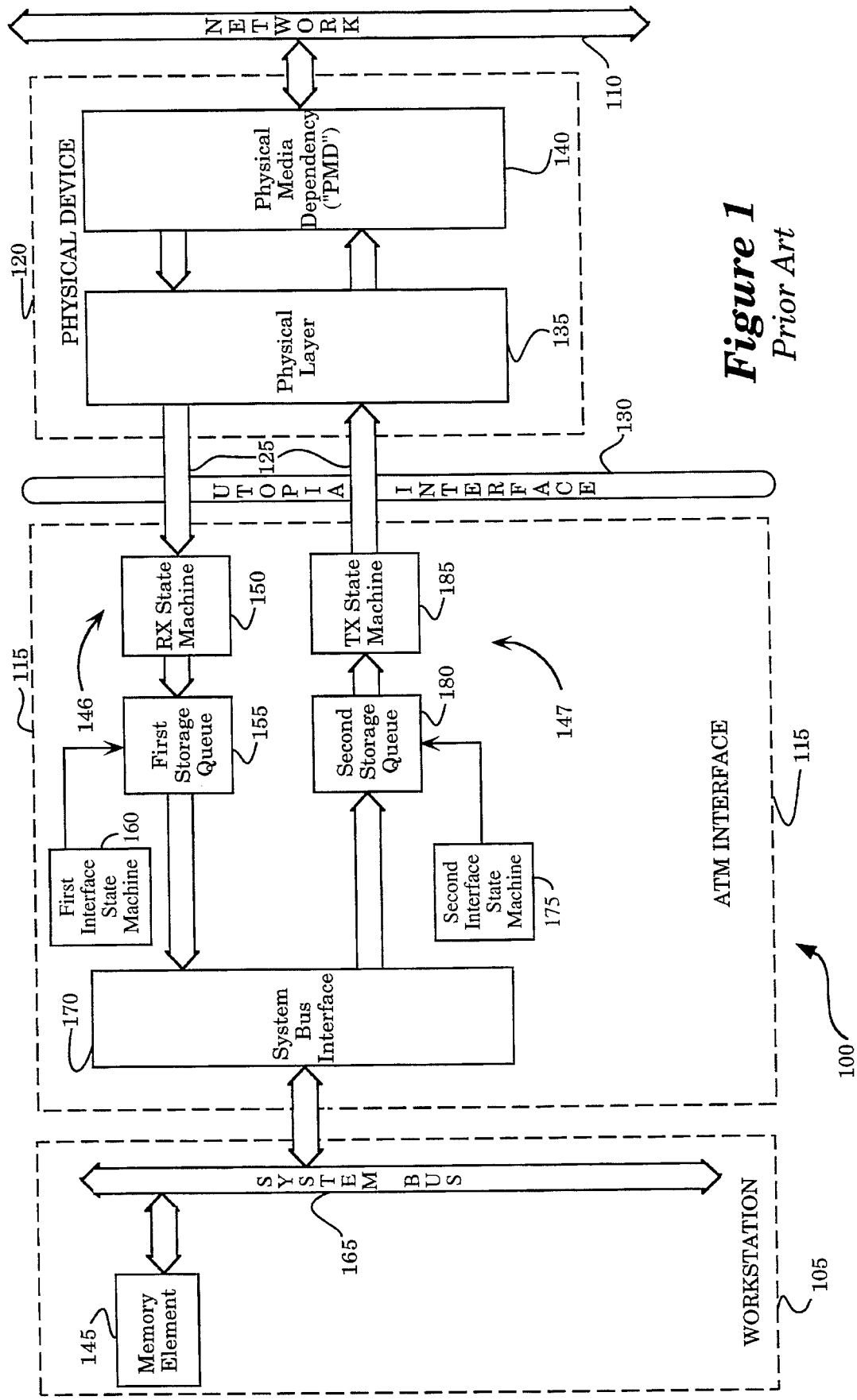
FIG. 1 is a block diagram of a conventional ATM interface.
Figure 2:
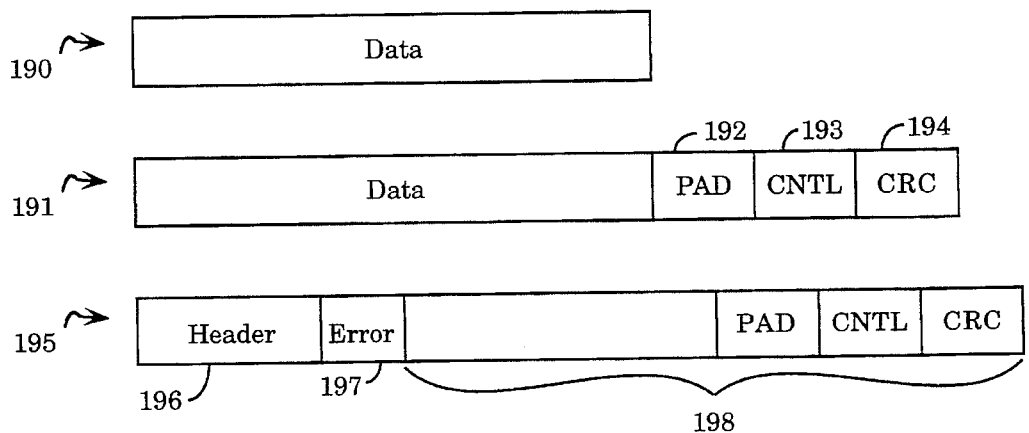
FIG. 2 is a block diagram of the data structure of the SDU and PDU datagrams and ATM cells.
Figure 8:
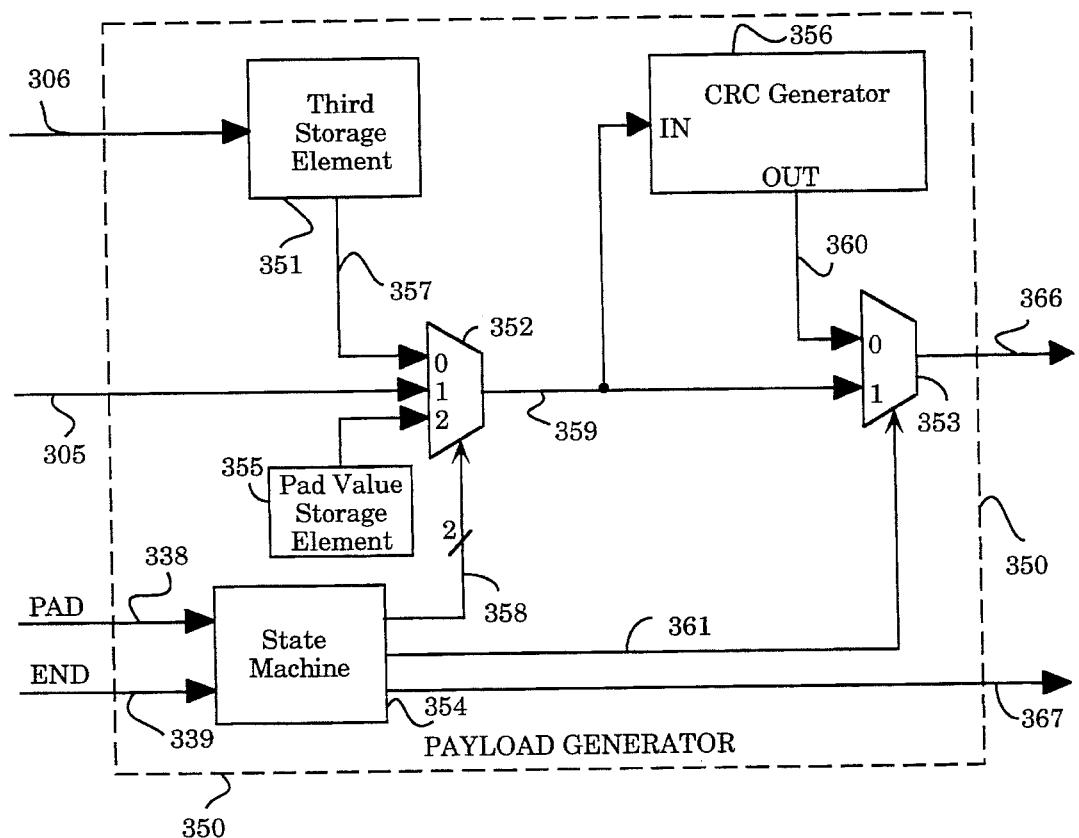
FIG. 8 is a block diagram of an illustrative embodiment of the payload generator of FIG. 4.

Referring to FIG. 8, the payload generator 350 comprises a third local storage element 351, a first and second selector 352 and 353, a state machine 354, a pad value storage element 355 (set to any whole number including zero) and a CRC generator 356. The allocated host memory inputs the datagram via data line 305 into the first selector 352. Synchronously, the delay element (see FIG. 4) inputs the channel number via communication line 306 into the third local storage element 351 and the address generator inputs the PAD and END control signals via control lines 338 and 339 into the state machine 354.

The channel number operates as an index for the third local storage element 351 to selectively output CNTL information into the first selector 352 via signal line 357. The PAD and END signals, however, are used by the state machine 354 to appropriately assert and deassert the select lines 358 to control the first selector 352 to output the datagram along with the CNTL information and correctly padded by the pad value storage element 355 (e.g., register), if appropriate, through a signal line 359. This datagram is transferred into the CRC generator 356 and the second selector 353.

Accordingly, the CRC generator 356 receives the datagram and produces a CRC number which is input into the second selector 353 through signal line 360. Based on the value of the PAD and END signals, the state machine 354 will determine whether the CRC generator 356 is to append the CRC checkword by appropriately asserting a control line 361 of the second selector 353.

Thereafter, as shown in FIG. 4, the payload is input into the main selector 365 along the payload communication line 366 while the header generator 370 inserts the header via communication line 367 based on the channel number. The payload generator 350 selects the main selector 365 to output an ATM cell, minus the error byte provided by the physical device, through communication line 369.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A scalable, asynchronous transfer mode ("ATM") interface, comprising:

an addressing element including
a scheduler configured to initiate generation of an ATM cell, and
an address generator coupled to said scheduler, said address generator is configured to receive at least one channel number from said scheduler, and to translate said at least one channel number into at least one memory address;
a memory element accessible by said addressing element, said memory element is configured to contain at least one datagram corresponding to said at least one memory address;
a cell generating element coupled to said memory element, said cell generating element is configured to receive said at least one datagram and to produce said ATM cell including a header and a payload including said at least one datagram; and a controlling element coupled to said scheduler and address generator of said addressing element and said cell generating element, said controlling element is configured to control the operations of said addressing element and said cell generating element.

2. The ATM interface according to claim 1, wherein said address generator is configured to transmit said at least one memory address to said memory element.

3. The ATM interface according to claim 2, wherein said scheduler includes a priority-based scheduling unit configured to queue said at least one channel number and to appropriately output said at least one channel number to said address generator; and a plurality of scheduler elements coupled to said priority-based scheduling unit, in which one of said plurality of scheduler elements transmits the at least one channel number to said priority-based scheduling unit.

4. The ATM interface according to claim 3, wherein said priority-based scheduling unit operates under a round-robin arbitration protocol.

5. The ATM interface according to claim 3, wherein said plurality of scheduler elements include at least one constant bit rate scheduler element.

6. The ATM interface according to claim 3, wherein said plurality of scheduler elements include at least one variable bit rate scheduler element.

7. The ATM interface according to claim 1, wherein said cell generating element includes a payload generator configured to produce the payload of the ATM cell based on the at least one datagram;

a header generator configured to produce the header of the ATM cell based on the at least one channel number; and a select element coupled to said payload generator and said header generator, said select element is configured to produce said ATM cell by first outputting said header followed by said payload.

8. The ATM interface according to claim 7, wherein said payload generator includes a first selector configured to selectively output a second datagram including at least said at least one datagram and control information, said first selector including a first input to receive said at least one datagram, a second input to receive padding information and a third input to receive control information;

a second selector coupled to said first selector, said second selector is configured to output the payload of the ATM cell, said second selector including a first input to receive said second datagram and a second input to receive CRC information;

a CRC generator coupled to said second input of said second selector, said CRC generator is configured to provide said CRC information; and a state machine coupled to said first selector and said second selector, said state machine is configured to select inputs of the first selector and the second selector to produce the payload of the ATM cell.

9. The ATM interface according to claim 7, wherein said header generator includes local memory separated into a plurality of entries of which one of said plurality of entries is selected by the at least one channel number.

10. A computer system, coupled to a network, comprising:

a host processor;

a system bus coupled to said host processor; and a network module coupled to said system bus and said network, said network module is configured to enable an ATM cell to be transferred to and received from said network, said network module including a scalable, asynchronous transfer mode ("ATM") interface coupled to the system bus, the ATM interface including an addressing element configured to initiate generation of the ATM cell, said addressing element includes a scalable scheduler configured to produce at least one channel number, and an address generator coupled to said scheduler, said address generator is configured to produce at least one memory address based on said at least one channel number, a memory element accessible by said addressing element, said memory element is configured to contain at least one datagram corresponding to said at least one memory address, a cell generating element coupled to said memory element, said cell generating element is configured to receive said at least one datagram and to produce said ATM cell including a header and a payload including said at least one datagram; and a controlling element coupled to said scheduler and address generator on said addressing element and said cell generating element, said controlling element is configured to control the operations of said addressing element and said cell generating element; and a physical device coupled to said ATM interface and the network, said physical device is configured to convert the ATM cell into a bit stream and to place said bit stream into a format used by the network.

11. The computer system according to claim 10, wherein said address generator of the ATM interface is configured to use said at least one channel number as an index in order to translate said at least one channel number into said at least one memory address and to output said at least one memory address to said memory element.

12. The computer system according to claim 11, wherein said scheduler of the ATM interface includes a priority-based scheduling unit configured to queue said at least one channel number and to appropriately output said at least one channel number to said address generator; and a plurality of scheduler elements coupled to said priority-based scheduling unit, in which one of said plurality of scheduler elements transmits the at least one channel number to said priority-based scheduling unit.

13. The computer system according to claim 12, wherein each of said plurality of scheduler elements is assigned a unique, predetermined priority.

14. The computer system according to claim 12, wherein said cell generating element of the ATM interface includes a payload generator configured to produce the payload of the ATM cell based on said at least one datagram;

a header generator configured to produce the header of the ATM cell based on the at least one channel number; and a select element coupled to said payload generator and said header generator, said select element is configured to produce said ATM cell by first outputting said header followed by said payload.

15. The computer system according to claim 14, wherein said payload generator of the ATM interface includes a first selector configured to selectively output a second datagram including at least said at least one datagram and control information, said first selector including a first input to receive said at least one datagram, a second input to receive padding information and a third input to receive control information;

a second selector coupled to said first selector, said second selector is configured to output the payload of the ATM cell, said second selector including a first input to receive said second datagram ATM cell and a second input to receive CRC information;

a CRC generator coupled to said second input of said second selector, said CRC generator is configured to provide said CRC information; and a state machine coupled to said first selector and said second selector, said state machine is configured to select inputs of the first selector and the second selector to produce the payload of the ATM cell.

16. The computer system according to claim 14, wherein said header generator includes local memory separated into a plurality of entries of which one of said plurality of entries is selected by the at least one channel number.

17. In a scalable, asynchronous transfer mode ("ATM") interface for generating an ATM cell including a header and a payload, a method for producing the ATM cell comprising the steps of:

generating at least one channel number by a scalable scheduler in response to a particular event;

generating a memory address and a plurality of control signals based on the channel number;

retrieving a datagram stored in a memory location addressable by the memory address;

producing the payload of the ATM cell based on the datagram, the plurality of control signals and the channel number;

producing the header of the ATM cell based on the channel number; and appending the payload to the header to form the ATM cell.

18. A scalable, asynchronous transfer mode ("ATM") interface for generating an ATM cell, comprising:

an addressing element including
a scheduler configured to produce a channel number, and
an address generator coupled to said scheduler, said address generator configured to receive said channel number, to translate said channel number into a memory address, and to output said memory address;

a memory element accessible by said addressing element, said memory element is configured to contain at least one datagram corresponding to said memory address and to subsequently output said at least one datagram;

a cell generating element coupled to said memory element, said cell generating element is configured to receive said at least one datagram and to produce the ATM cell including a header and a payload including said at least one datagram; and a controlling element coupled to said addressing element and said cell generating element, said controlling element is configured to control the operations of said addressing element and said cell generating element.

19. A computer system, coupled to a network, comprising:

a host processor;

a system bus coupled to said host processor; and a network module coupled to said system bus and the network, said network module is configured to enable an ATM cell to be transferred to and received from the network, said network module including an asynchronous transfer mode ("ATM") interface coupled to said system bus, said ATM interface including
an addressing element including
a scheduler, and
an address generator coupled to said scheduler, said address generator configured to receive a channel number from said scheduler, to translate said channel number into a memory address, and to output said memory address,
a memory element accessible by said addressing element, said memory element is configured to contain at least one datagram corresponding to said memory address and to subsequently output said at least one datagram,
a cell generating element coupled to said memory element, said cell generating element is configured to receive said at least one datagram and to produce the ATM cell including a header and a payload including said at least one datagram, and
a controlling element coupled to said addressing element and said cell generating element, said controlling element is configured to control the operations of said addressing element and said cell generating element; and a physical device coupled to said ATM interface and the network, said physical device is configured to convert the ATM cell into a bit stream and to place said bit stream into a format used by the network.

* * * * *